United States Patent
Miura (10) Patent No.: US 7,460,177 B2
(45) Date of Patent: Dec. 2, 2008

(54) VIDEO SIGNAL CLAMPING DEVICE

(75) Inventor: Hiroya Miura, Shinagawa-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 610 days.

(21) Appl. No.: 11/148,824

(22) Filed: Jun. 9, 2005

(65) Prior Publication Data

US 2005/0275756 A1 Dec. 15, 2005

(30) Foreign Application Priority Data

Jun. 10, 2004 (JP) ............................. 2004-172786

(51) Int. Cl.
*H03M 1/12* (2006.01)
*H04N 5/16* (2006.01)

(52) U.S. Cl. .................. 348/572; 348/695; 348/697

(58) Field of Classification Search ................. 348/572, 348/695, 697
See application file for complete search history.

(56) References Cited

U.S. PATENT DOCUMENTS

| | | | |
|---|---|---|---|
| 5,280,356 A * | 1/1994 | Hiramatsu et al. .......... 348/691 |
| 5,410,366 A | 4/1995 | Hostetler | |
| 5,705,272 A * | 1/1998 | Taniguchi .................. 428/408 |
| 5,875,002 A * | 2/1999 | Nishiyama .................. 348/691 |
| 7,095,452 B2 * | 8/2006 | Tachibana ................... 348/691 |
| 7,126,645 B2 * | 10/2006 | Keen .......................... 348/695 |
| 7,345,714 B2 * | 3/2008 | Chen .......................... 348/692 |
| 2002/0033764 A1 | 3/2002 | Graen | |
| 2004/0027492 A1 | 2/2004 | Keen | |
| 2005/0001750 A1 * | 1/2005 | Lo et al. ...................... 341/143 |
| 2006/0203128 A1 * | 9/2006 | Sasahara et al. ............. 348/682 |

FOREIGN PATENT DOCUMENTS

DE 10042281 A1 3/2002
JP 7-135579 A 5/1995

* cited by examiner

*Primary Examiner*—Brian P Yenke
(74) *Attorney, Agent, or Firm*—Canon U.S.A., Inc., IP Division (57) ABSTRACT

A signal processing device of the present invention includes: an input unit which inputs an analog video signal; an A/D converter which converts the analog video signal to a digital video signal; a detecting unit which detects a level in a predetermined period of the digital video signal output from the A/D converter; a difference output unit which detects a difference between the level detected by the detecting unit and a desired value; a modulating unit which performs sigma-delta modulation on an output from the difference output unit; and a clamping unit which performs a clamping process on the analog video signal input by the input unit based on an output from the modulating unit and which outputs the clamped analog video signal to the A/D converter.

17 Claims, 5 Drawing Sheets

VIDEO SIGNAL CLAMPING DEVICE

BACKGROUND OF THE INVENTION

1. Field of the Invention

The present invention relates to a signal processing device, particularly to a device for clamping a video signal.

2. Description of the Related Art

In a known analog video signal input unit of a television receiver, a video tape recorder, or a digital video camera, a signal potential between a capacitor provided in series with an input signal and an input terminal of an A/D converter (ADC) is increased/decreased by a circuit including a resistor and a current source or a circuit including current sources. Also, by using a video amplifier for level shifting provided in a signal path, a pedestal level of the signal is clamped (e.g., see Japanese Patent Laid-Open No. 7-135579).

Figure 5:
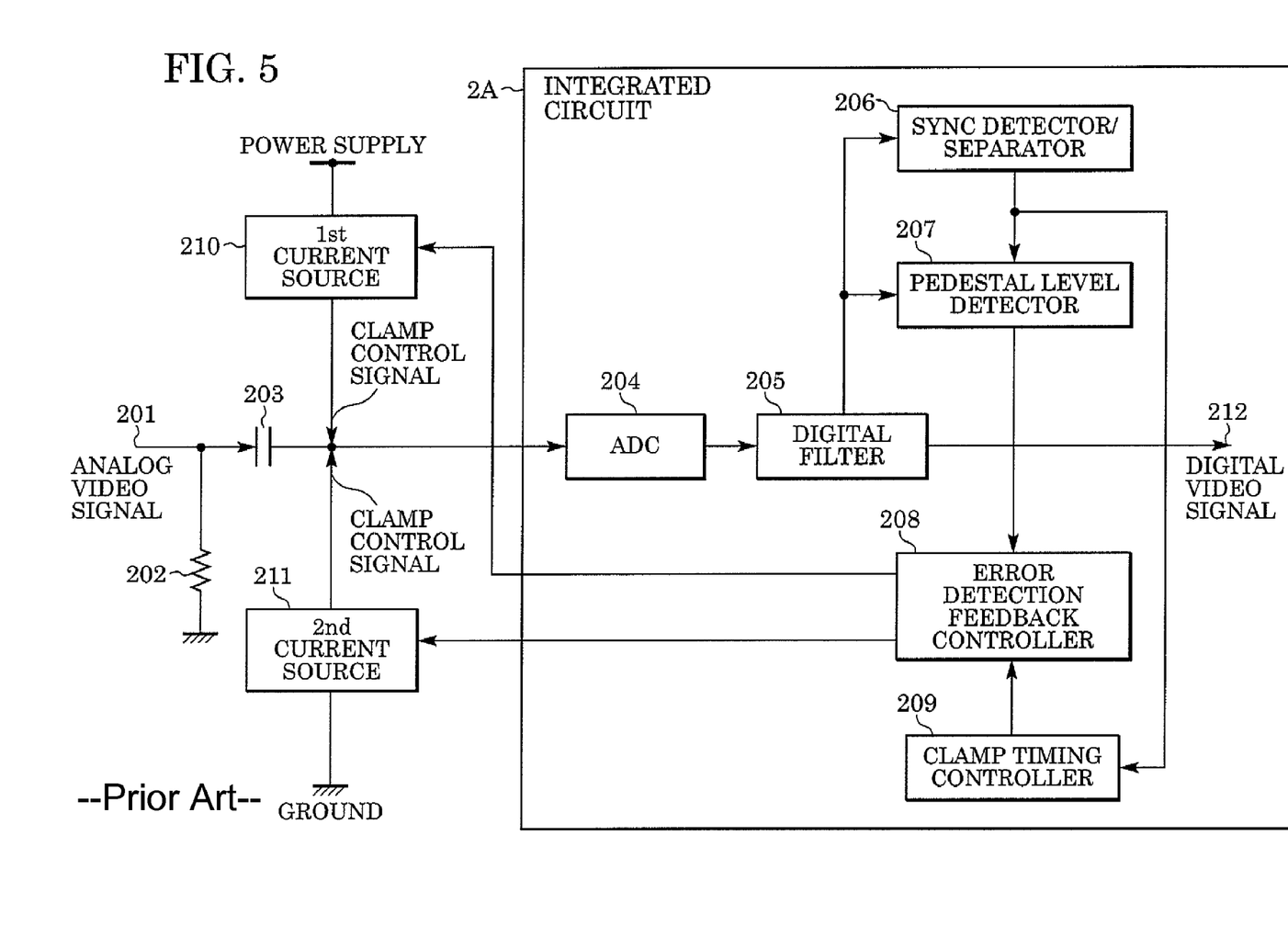
FIG. 5 shows an example of a clamp circuit in a known digital video signal processing system.

FIG. 5 shows an example of a clamp circuit in a known digital video signal processing system. As shown in FIG. 5, in the digital video signal processing system, an input analog video signal is converted to a digital signal by an A/D converter (ADC) 204 and then a pedestal level of the input video signal is detected. Then, by performing feedback control on a current source or the like so that a difference between the detected pedestal level and a desired value becomes 0 (zero), clamping control is performed.

In FIG. 5, an input signal 201 is an analog video signal. This signal is a composite signal compatible with a television signal system, such as an NTSC (National Television System Committee) system or a PAL (phase-alternation line) system. A terminating resistor 202 has impedance matching with a transmission line for transmitting the input signal 201. Herein, a terminating resistor of 75 ohms is used in accordance with a transmission line of 75 ohms, which is typical in consumer-oriented video equipment.

A coupling capacitor 203 removes a DC component and realizes AC coupling between a connected external device (not shown) and an input terminal of the ADC 204 of this circuit. The ADC 204 converts the input signal 201 to a digital signal. A digital filter 205 is a low-pass filter or a notch filter, which removes a subcarrier signal component from the input signal 201 as a composite signal and which separates a luminance signal component with SYNC (synchronization).

A synchronization signal (SYNC) detector/separator 206 separates a composite SYNC signal component from the luminance signal component with SYNC obtained from the digital filter 205. A pedestal level detector 207 detects a digital level (signal level) of a pedestal portion with reference to the composite SYNC signal component obtained from the SYNC detector/separator 206.

An error detection feedback controller 208 compares an arbitrarily-set desired value of a pedestal level with a digital value obtained by AD-converting the signal level of the input signal 201 detected by the pedestal level detector 207, so as to obtain a difference (error) therebetween. In accordance with the difference, the error detection feedback controller 208 outputs a control signal to a first current source 210 and a second current source 211 to correct the error, so as to perform feedback control.

A clamp timing controller 209 controls output timing of the control signal from the error detection feedback controller 208 based on the composite SYNC signal component obtained from the SYNC detector/separator 206. For example, by performing clamping control only in a back porch portion of a video signal, an influence on the video signal can be avoided.

The first current source 210 is disposed between a connecting line for connecting the capacitor 203 and the ADC 204 and a power supply voltage. This current source 210 is turned ON when an output value of the error detection feedback controller 208 is 1, and charges the capacitor 203 to raise the pedestal level. The second current source 211 is disposed between the connecting line for connecting the capacitor 203 and the ADC 204 and a ground. This current source 211 is turned ON when the output value of the error detection feedback controller 208 is 0, and discharges the capacitor 203 to decrease the pedestal level.

The first current source 210 may be replaced by a resistor and control may be performed by only the second current source 211. Likewise, the second current source 211 may be replaced by a resistor and control may be performed by only the first current source 210.

The input signal 201 is clamped by the first current source 210 or the second current source 211, is converted to a digital signal by the ADC 204, and is filtered through the digital filter 205. Accordingly, a digital video signal 212 is obtained. In FIG. 5, the ADC 204, the digital filter 205, the SYNC detector/separator 206, the pedestal level detector 207, the error detection feedback controller 208, and the clamp timing controller 209 are integrated to form an integrated circuit 2A.

Instead of using the first and second current sources 210 and 211, a video amplifier may be provided in a signal path after the capacitor 203 in order to shift a signal level. When a video amplifier is used, clamping control is realized by inputting an input analog signal to a positive input side of the video amplifier and inputting a control signal from the error detection feedback controller 208 to a negative input side thereof.

However, a clamp circuit of a simpler configuration capable of clamping a pedestal level of an analog video signal without using a current source or a video amplifier has been required.

SUMMARY OF THE INVENTION

The present invention has been made to solve the above-described problem and provides a device of a simpler configuration capable of performing a clamping process.

According to an aspect of the present invention, a signal processing device includes an input unit which inputs an analog video signal; an A/D converter which converts the analog video signal to a digital video signal; a detecting unit which detects a level in a predetermined period of the digital video signal output from the A/D converter; a difference output unit which detects a difference between the level detected by the detecting unit and a desired value; a modulating unit which performs sigma-delta modulation on an output from the difference output unit; and a clamping unit which performs a clamping process on the analog video signal input by the input unit based on an output from the modulating unit and which outputs the clamped analog video signal to the A/D converter.

Further features and advantages of the present invention will become apparent from the following description of exemplary embodiments with reference to the attached drawings.

DESCRIPTION OF THE EMBODIMENTS

Hereinafter, embodiments of the present invention will be described with reference to the drawings.

First Embodiment

Figure 1:
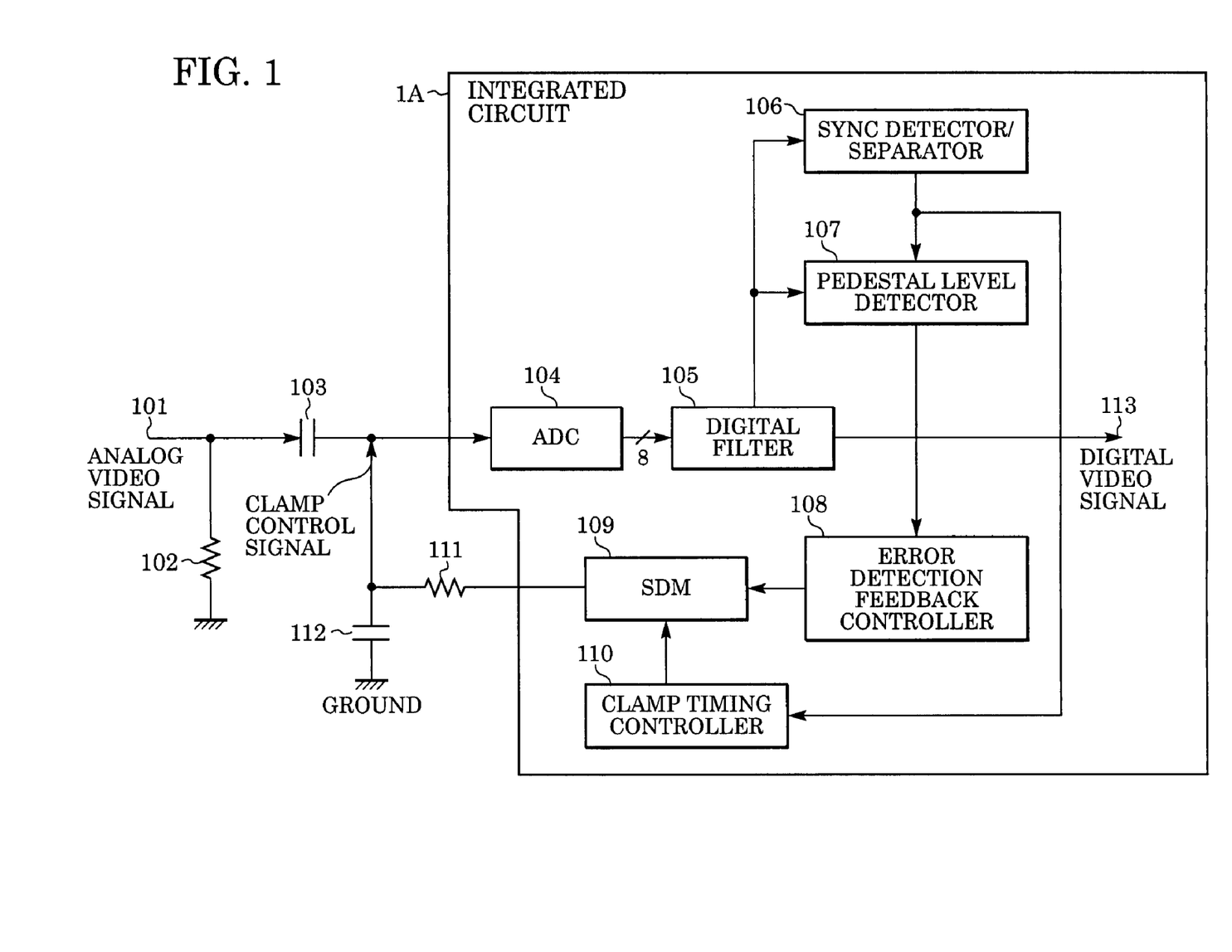
FIG. 1 is a block diagram showing a schematic configuration of a video signal processing system (or a video processing device) including a clamp circuit for a video signal according to a first embodiment of the present invention.

First, a clamp circuit for a video signal according to a first embodiment of the present invention will be described. FIG. 1 is a block diagram showing a schematic configuration of a video signal processing system (or a video processing device) including the clamp circuit according to the first embodiment.

As shown in FIG. 1, a circuit for performing AD conversion and digital processing is configured as an application-specific integrated circuit (ASIC). In FIG. 1, an input signal 101 is an analog video signal. Specifically, the input signal 101 is a composite video signal of the NTSC system. The input signal 101 is not limited to a composite video signal of the NTSC system, but may be a luminance signal (Y) or a video signal of the PAL system or the like.

A terminating resistor 102 is connected between a transmission line for transmitting the input signal 101 and a ground and realizes impedance matching with the transmission line. Herein, a terminating resistor of 75 ohms is used in accordance with the transmission line of 75 ohms, which is typical in consumer-oriented video equipment.

A coupling capacitor 103 is connected between the transmission line of a video signal (input signal 101) and an input terminal of an A/D converter (ADC) 104, which will be described later. The coupling capacitor 103 removes a DC component of the input video signal 101, which is supplied from an external device (not shown) through the transmission line, and inputs the video signal to the input terminal of the ADC 104. In other words, the coupling capacitor 103 is used for AC-coupling the input signal 101.

The ADC 104 converts the AC-coupled analog input signal 101 to a digital signal. Herein, the ADC 104 operates at a sampling rate of 27 MSPS (mega samples per second) and outputs digital data of 8 bits per sample.

A digital filter 105 removes a subcarrier signal component from the digital video signal (composite signal) output from the ADC 104, separates a luminance signal component with SYNC, and outputs a digital video signal 113. Specifically, the digital filter 105 is a low-pass filter or a notch filter.

A synchronization signal (SYNC) detector/separator (SYNC separating unit) 106 separates a composite SYNC signal component from the luminance signal component with SYNC obtained from the digital filter 105. A pedestal level detector (level detecting unit) 107 detects a digital level (signal level) of a pedestal portion with reference to the composite SYNC signal component obtained from the SYNC detector/separator 106.

An error detection feedback controller (difference output unit) 108 compares an arbitrarily-set desired value of a pedestal level with the signal level detected by the pedestal level detector 107 and outputs a difference (error) therebetween to a sigma-delta modulator (SDM) (modulating unit) 109, which will be described later.

Figure 2:
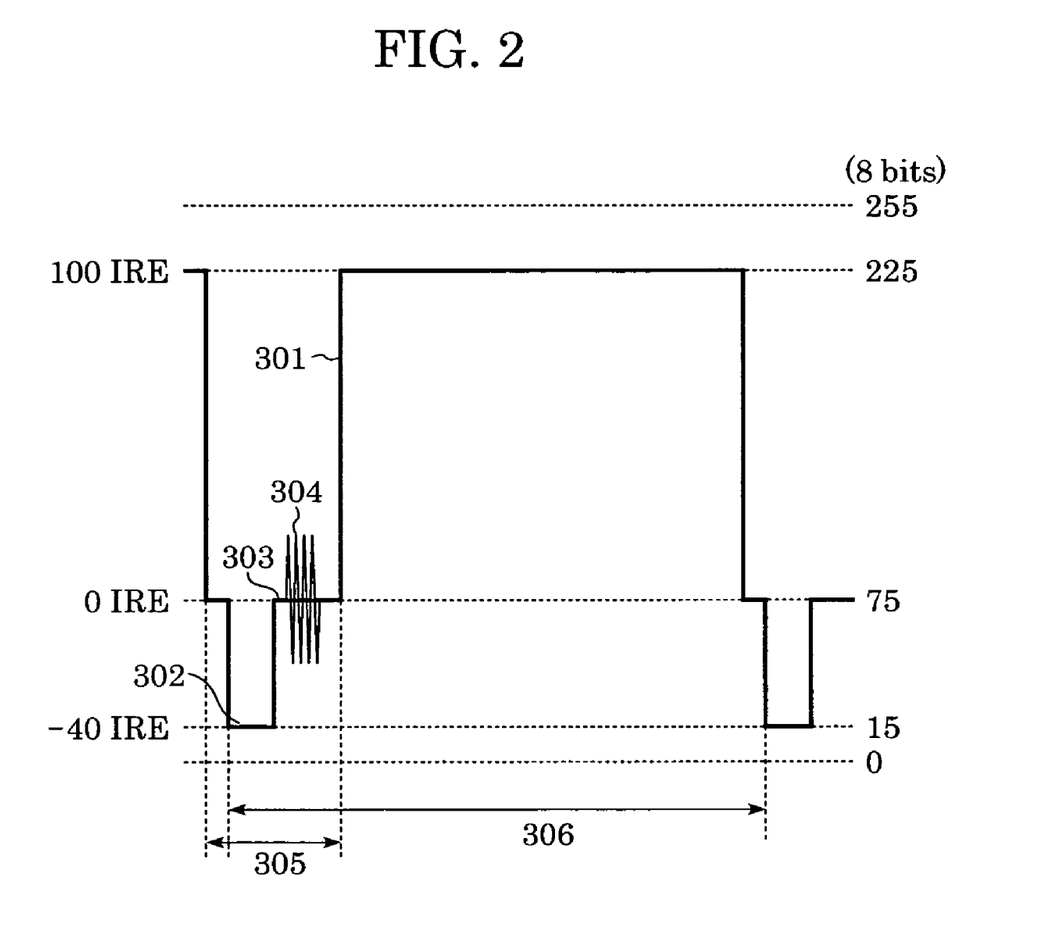
FIG. 2 shows an example of a video signal (NTSC) according to the first embodiment.

Now, a video signal processed in this embodiment will be described. FIG. 2 shows a state of an input video signal processed in this embodiment. The video signal shown in FIG. 2 is equivalent to one horizontal line (1H) of a television signal of the NTSC system. In a vertical axis, the left side indicates an analog signal level (−40 to 100 IRE) of an analog video signal and the right side indicates a digital signal level (0 to 255) of a digital video signal after AD conversion. The values −40 to 100 IRE on the left side of FIG. 2 indicate an analog input range of the input signal 101 according to an NTSC format.

As shown in FIG. 2, in this embodiment, the pedestal level (signal level at a back porch 303) is 0 IRE, the signal level of a composite SYNC chip 302 is −40 IRE, and a video signal portion of a video signal waveform 301 has a white luminance of 100% level. That is, the video signal waveform 301 shown in FIG. 2 is a signal of a white luminance of 100% and is thus a composite signal, but a chroma signal is not superimposed on the video signal portion (a period 306 except a period 305) in order to simplify the description.

On the other hand, the values from 0 to 255 on the right side in FIG. 2 correspond to an output range (8 bits) of the ADC 104 in contrast to the analog input range. Herein, digital values that can be obtained in an ideal pedestal clamping are shown.

As can be understood from the figure, a desired digital value of the pedestal level is 75, which corresponds to 0 IRE. The video signal waveform 301 is a waveform of the input signal 101. The composite SYNC chip 302 indicates a horizontal synchronization signal. A waveform 304 indicates a color burst signal, which has a frequency of 3.579545 MHz in the NTSC system. A period 305 is a horizontal blanking period (horizontal retrace period) and is 10.9±0.2 µS in the NTSC system. A period 306 is a period of one horizontal line and is 63.555 µS in the NTSC system.

Referring back to FIG. 1, the sigma-delta modulator (SDM) 109 receives a pedestal level error from the error detection feedback controller 108 and performs sigma-delta modulation (also called "delta-sigma modulation") at an operating frequency of 54 MHz, which is sufficiently higher than a bandwidth of the input video signal, and then outputs a modulated signal of 1 bit per sample.

Incidentally, since "sigma" and "delta" may be inverted, the sigma-delta modulator 109 may also be called a "delta-sigma modulator" (DSM).

In order to increase accuracy of a clamping process, the output of the SDM 109 may be digital data of 2 bits per sample, and a low-pass filter (LPF) unit provided on a subsequent stage of the SDM 109 may be replaced by a D/A converter.

A clamp timing controller 110 controls output timing of the SDM 109 based on the composite SYNC signal component obtained from the SYNC detector/separator 106.

In a typical pedestal clamping, a clamping process is often performed in the back porch 303 included in the horizontal blanking period 305, which is not displayed as an image. This method is applied in this embodiment.

The SDM 109 performs a clamping process in response to a timing signal from the clamp timing controller 110.

A resistor 111 is connected between an output terminal of the SDM 109 and a node of the coupling capacitor 103 and the ADC 104. One terminal of a capacitor 112 is connected to the ground and the other terminal thereof is connected to the SDM 109 through the resistor 111. The capacitor 112 and the resistor 111 in combination serve as a low-pass filter. The low-pass filter smoothes (removes a high-frequency component which affects images) a signal which has been feedback-controlled to reduce the pedestal level error, that is, a signal which has been sigma-delta modulated by the SDM 109, so as to generate a clamp control signal. By using this clamp control signal, the input signal 101 from which a DC component has been removed by the coupling capacitor 103 is clamped.

As described above, a DC component is removed from the input signal 101 by the coupling capacitor 103, and pedestal clamping is performed on the signal. Then, the signal is converted to a digital signal by the ADC 104 and is filtered through the digital filter 105, so that the digital video signal 113 is obtained.

The integrated circuit (IC) 1A is an application-specific IC (ASIC), in which the above-described ADC 104, the digital filter 105, the SYNC detector/separator 106, the pedestal level detector 107, the error detection feedback controller 108, the SDM 109, and the clamp timing controller 110 are integrated. Incidentally, the IC 1A is a semiconductor circuit fabricated by only a CMOS (complementary metal oxide semiconductor) process.

An operating clock used in the IC 1A is generated in the following way. An oscillator (not shown) generates a clock of 13.5 MHz and a PLL (phase locked loop) circuit (not shown) multiplies the clock by 2 and 4. Accordingly, an operating clock of 27 MHz (=13.5 MHz×2) and 54 MHz (=13.5 MHz× 4) is generated.

Another frequency may be used for the operating clock. For example, a frequency of the oscillator may be regarded as a subcarrier frequency of a video format (NTSC or PAL) of an input video signal, and the PLL circuit may multiply the sub-carrier frequency. By using these frequencies, the system configuration can be simplified.

A significant difference between the above-described pedestal clamping method according to the first embodiment shown in FIG. 1 and the known art shown in FIG. 5 is a method for generating a clamp control signal, which controls the level of a video signal output from the coupling capacitor 103.

Now, the clamp circuit of the first embodiment is compared with the clamp circuit of the known art shown in FIG. 5. In the known art shown in FIG. 5, a pedestal level is controlled by current sources (or a video amplifier) which are externally attached to the IC 2A.

On the other hand, in this embodiment, a signal for controlling a pedestal level is generated by a combination of the SDM 109 and the low-pass filter. The combination of the SDM 109 and the low-pass filter may be regarded as a sigma-delta modulating D/A converter.

In this way, by providing the SDM 109, which is small-scale and thus can be easily incorporated into the IC 1A, only the low-pass filter composed of R (resistor 111) and C (capacitor 112) is required as an external component, whereas the known clamp circuit requires current sources, such as transistors, or a video amplifier as an external component of the IC 2A.

With this configuration, the number of components in the system can be reduced, and also a packaging area and a cost can be reduced compared to the known art.

Further, by changing a characteristic of the low-pass filter composed of R and C, a high-frequency component in the SDM 109 can be intentionally superimposed on the input video signal, so that a problem of beats on output images to specific input images causing in some systems can be solved.

This problem can be solved by performing pseudo dithering by using a random noise characteristic of the SDM 109.

Second Embodiment

Figure 3:
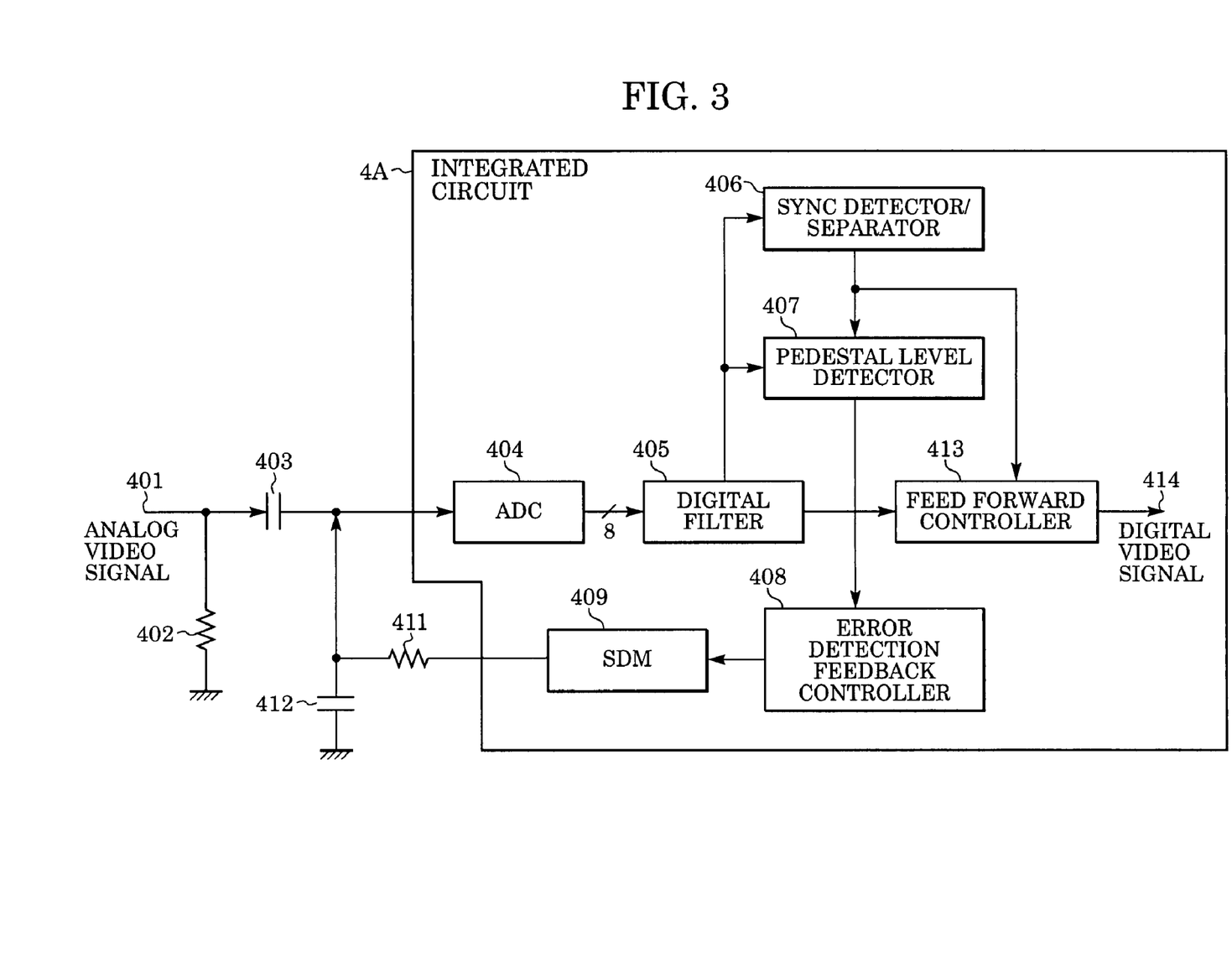
FIG. 3 is a block diagram showing a schematic configuration of a video signal processing system including a clamp circuit for a video signal according to a second embodiment of the present invention.

Next, a clamp circuit for a video signal according to a second embodiment of the present invention will be described. FIG. 3 is a block diagram showing a schematic configuration of a video signal processing system (or a video processing device) including the clamp circuit according to the second embodiment.

In the second embodiment shown in FIG. 3, components denoted by reference numerals 401 to 409, 411, and 412 are equivalent to those denoted by reference numerals 101 to 109, 111, and 112 in the first embodiment shown in FIG. 1, and thus the descriptions thereof will be omitted. The circuit configuration of the second embodiment is significantly different from that of the first embodiment in that the clamp timing controller 110 shown in FIG. 1 is not provided and that a feed forward controller 413 is provided in the subsequent stage of the digital filter 405.

With this configuration, the clamp circuit according to the second embodiment performs a clamping process over an entire period of one horizontal line, not in only part of the period of one horizontal line. Further, the feed forward controller 413 complements fluctuations in a pedestal level if they cannot be suppressed by clamping control by a feedback loop.

More specifically, when a difference (error) between a desired value of a pedestal level and an actual input digital value, which is detected in the error detection feedback controller 408, remains after feedback control of a pedestal clamping process, the feed forward controller 413 performs feed forward control in order to bring the pedestal level close to the desired value and then outputs a digital video signal 414.

In other words, the digital video signal 414 is generated by performing pedestal clamping on an input signal 401, converting the input signal 401 to a digital signal by the ADC 404, and filtering through the digital filter 405 and the feed forward controller 413. An IC 4A is an ASIC, in which the ADC 404, the digital filter 405, the SYNC detector/separator 406, the pedestal level detector 407, the error detection feedback controller 408, the SDM 409, and the feed forward controller 413 are integrated. For example, the IC 4A is a semiconductor circuit fabricated by a CMOS process.

As described above, in the clamp circuit according to the second embodiment, a pedestal level is controlled by using the SDM 409 and a low-pass filter in combination. With this configuration, current sources, such as transistors, or a video amplifier need not be externally attached to the IC 4A unlike in the known IC 2A shown in FIG. 5.

That is, a clamping process can be realized by providing the SDM 409, which is small-scale and thus can be easily incorporated into the IC 4A, and by externally attaching a low-pass filter composed of R (resistor 411) and C (capacitor 412), as shown in FIG. 3. Accordingly, the number of components can be reduced, and also a packaging area and a cost can be reduced compared to the known art.

Additionally, in the clamp circuit according to the second embodiment, sigma-delta modulation is performed with an operating frequency which is higher than a frequency band of an input video signal so as to generate a clamp control signal. Therefore, even when clamping control is performed over an entire period of a video signal, not in only a limited period of the video signal, noise and beat affecting the frequency band of the video signal do not occur.

Therefore, even when a large current leaks to the ADC 404, the video signal is not affected thereby and pedestal clamping control of a sufficient response performance can be realized.

Furthermore, in addition to pedestal clamping by feedback control, the second embodiment realizes feed forward control to complement fluctuations in a pedestal level which cannot be suppressed by the feedback control.

Third Embodiment

Figure 4:
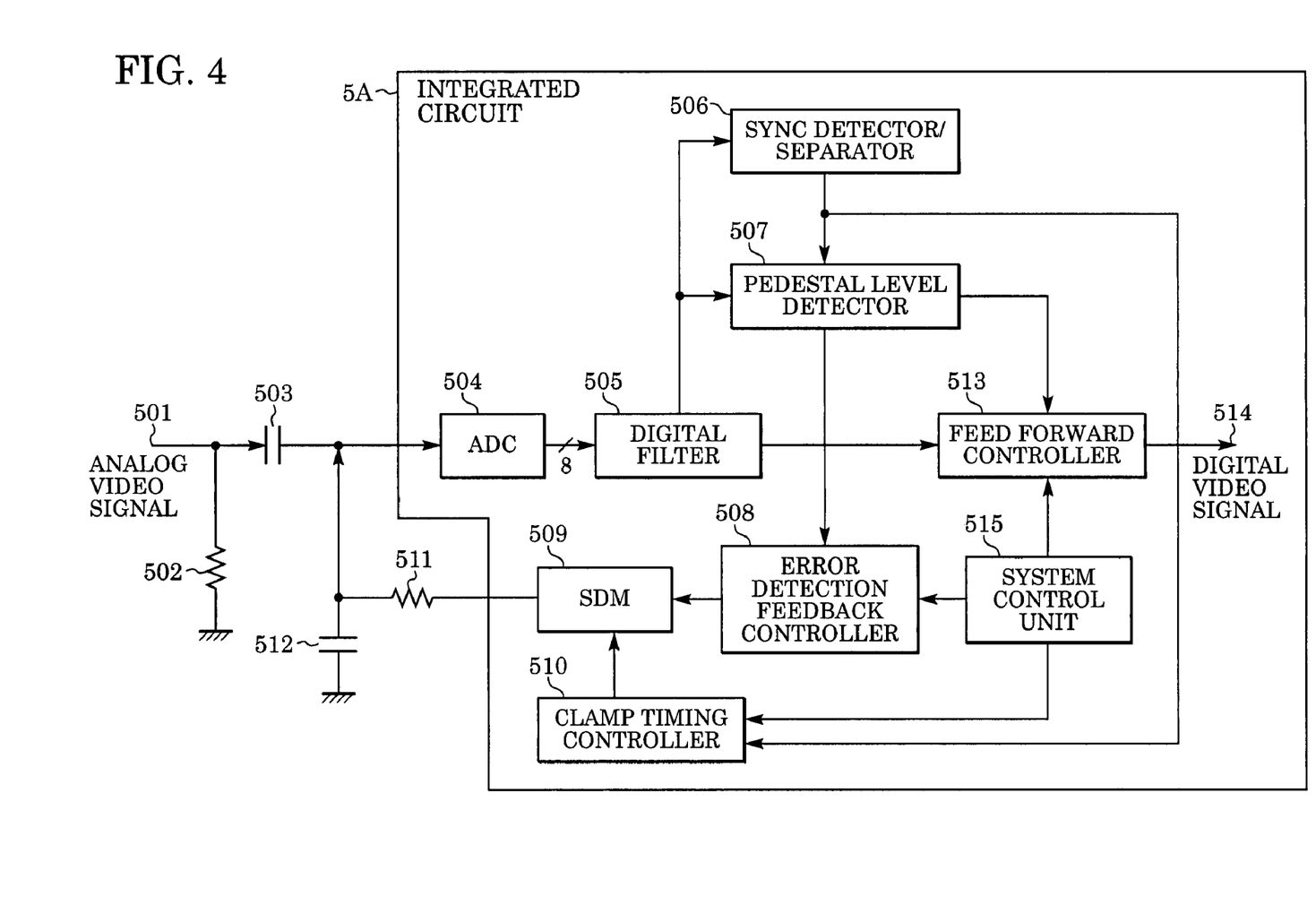
FIG. 4 is a block diagram showing a schematic configuration of a video signal processing system including a clamp circuit for a video signal according to a third embodiment of the present invention.

Next, a clamp circuit for a video signal according to a third embodiment of the present invention will be described. FIG. 4 is a block diagram showing a schematic configuration of a video signal processing system (or a video processing device) including the clamp circuit according to the third embodiment.

In the third embodiment shown in FIG. 4, components denoted by reference numerals 501 to 512 are equivalent to those denoted by reference numerals 101 to 112 in the first embodiment shown in FIG. 1, and thus the descriptions thereof will be omitted. A feed forward controller 513 shown in FIG. 4 is equivalent to the feed forward controller 413 shown in FIG. 3.

The circuit configuration shown in FIG. 4 is significantly different from that in the first and second embodiments in that a system control unit (setting control unit) 515 is provided. The system control unit 515 controls the error detection feedback controller 508, the clamp timing controller 510, and the feed forward controller 513 so as to control execution timing of a clamping process, an amount of error detection feedback control, and an amount of feed forward control in a variable manner.

More specifically, the system control unit 515 controls output timing of a clamp control signal in the clamp timing controller 510, an amount of error detection feedback control in the error detection feedback controller 508, and an amount of feed forward control in the feed forward controller 513 in a variable manner. An IC 5A is an ASIC, in which the ADC 504, the digital filter 505, the SYNC detector/separator 506, the pedestal level detector 507, the error detection feedback controller 508, the SDM 509, the feed forward controller 513, and the system control unit 515 are integrated. For example, the IC 5A is a semiconductor circuit fabricated by a CMOS process.

In the clamp circuit having the above-described configuration according to the third embodiment, a pedestal level is controlled by using the SDM 509 and a low-pass filter in combination. Therefore, current sources, such as transistors, or a video amplifier need not be externally attached to the IC 5A unlike in the IC 2A shown in FIG. 5.

That is, a clamping process can be performed by providing the SDM 509, which is small-scale and thus can be easily incorporated into the IC 5A, and by externally attaching a low-pass filter composed of R (resistor 511) and C (capacitor 512). With this configuration, the number of components can be reduced, and also a packaging area and a cost can be reduced compared to the known art.

Further, in the third embodiment, the system control unit 515 enables clamping control during only a blanking period and clamping control during an entire period including a video portion. Still further, various pedestal clamping methods can be realized. For example, an amount of clamping control can be changed in accordance with a luminance level of an input video signal.

Further, by allowing the system control unit 515 to control an amount of feedback control (feedback gain) by the SDM 509 and the low-pas filter and to control an amount of digital feed forward control (feed forward gain), pedestal clamping can be controlled more adequately.

As described above, in the known pedestal clamping control, current sources, such as transistors, or a video amplifier must be externally attached to the IC 2A as shown in FIG. 5.

On the other hand, in the clamp circuits according to the first to third embodiments, a small-scale SDM is incorporated into an IC which mainly processes a signal of a video bandwidth. In this configuration, only a low-pass filter (sigma-delta modulating DAC) composed of R (resistor) and C (capacitor) is required as an external component. This realizes a decrease in the number of components, a packaging area, and a cost.

Additionally, in the clamp circuits according to the above-described embodiments, the following are some advantages that can be obtained, depending on a system configuration.

A problem of beats on output images after a clamping process can be solved by performing pseudo dithering by using a random noise characteristic of the SDM. Specifically, a high-frequency component of sigma-delta modulation is intentionally superimposed on an input video signal by changing a characteristic of a low-pass filter.

In addition to pedestal clamping by feedback control, feed forward control is performed to complement fluctuations of a pedestal level which cannot be suppressed by the feedback control. Accordingly, more appropriate pedestal clamping control can be realized.

Even when clamping control is performed throughout an entire period of a video signal, not in only a limited period of the video signal, noise and beat affecting a frequency band of a video signal do not occur. Accordingly, even when a large current leaks to an ADC, the video signal is not affected thereby and pedestal clamping having a sufficient response performance can be realized.

In contrast, by providing a system control unit as a variable control unit, various pedestal clamping methods can be realized. For example, clamping control can be performed only in a blanking period or over an entire period of a video signal. Also, an amount of clamping control can be actively changed in accordance with a luminance level of an input video signal. Further, since the system control unit can control an amount of feedback control (feedback gain) by the SDM and the low-pass filter and an amount of a digital feed forward control (feed forward gain) in a variable manner, pedestal clamping control can be performed more adequately.

A processing function of each block in a system controller of the clamp circuit according to the above-described embodiments may be realized by reading a corresponding program from a memory and allowing a CPU (central processing unit) to execute the program. Alternatively, whole or part of each function may be realized by dedicated hardware.

Examples of the above-mentioned memory include: a non-volatile memory, such as a magneto-optical disk device and a flash memory; a recording medium capable of only reading data, such as a CD-ROM (compact disk read only memory); a volatile memory except a RAM (random access memory); and a computer-readable/writable recording medium formed by combining these media.

The program for realizing the function of performing each process in the system controller of the above-described clamp circuit may be recorded on a computer-readable recording medium, and the recorded program may be read and executed by a computer system so as to perform each process. Herein, the "computer system" includes hardware, such as an OS (operating system) and a peripheral device.

The program may be transferred from a storage device or the like of the computer system to another computer system through a transmission medium or transmission waves in the transmission medium. Herein, the "transmission medium" for transmitting the program is a medium having a function of transmitting information, for example, a network such as the Internet and a communication line such as a telephone line.

The program may be used to realize only part of the above-described function. Further, the program may be a so-called differential file (differential program), which can realize the above-described function in cooperation with a program which has been recorded in the computer system.

Further, a program product such as a computer-readable recording medium which records the above-described program can be applied to an embodiment of the present invention.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The number of claims corresponding to the description of each of the above-described embodiments is not necessarily one. Further, the above-described embodiments do not limit an element of each claim.

This application claims priority from Japanese Patent Application No. 2004-172786 filed Jun. 10, 2004, which is hereby incorporated by reference herein.

What is claimed is:

1. A signal processing device comprising:
an input unit which inputs an analog video signal;
an A/D converter which converts the analog video signal to a digital video signal;
a detecting unit which detects a level in a predetermined period of the digital video signal output from the A/D converter;
a difference output unit which detects a difference between the level detected by the detecting unit and a desired value;
a gain changing unit which changes an output gain of the difference output unit;
a modulating unit which performs sigma-delta modulation on an output from the difference output unit; and
a clamping unit which performs a clamping process on the analog video signal input by the input unit based on an output from the modulating unit and which outputs the clamped analog video signal to the A/D converter.

2. The signal processing device according to claim 1, wherein the clamping unit comprises a low-pass filter which filters the output from the modulating unit.

3. The signal processing device according to claim 1, wherein the modulating unit outputs a modulation result over an entire period of one horizontal line of the analog video signal, and the clamping unit performs the clamping process based on the output from the modulating unit over the entire period of one horizontal line of the analog video signal.

4. The signal processing device according to claim 1, wherein the detecting unit detects a pedestal level of the digital video signal, the modulating unit outputs a modulation result only in a pedestal period of the analog video signal, and the clamping unit performs the clamping process only in the pedestal period.

5. The signal processing device according to claim 1, wherein an operating frequency of the modulating unit is higher than a frequency band of the analog video signal.

6. The signal processing device according to claim 5, wherein the operating frequency of the modulating unit is n times a color subcarrier signal frequency of the analog video signal, wherein n is an integer of 2 or more.

7. The signal processing device according to claim 1, wherein the modulating unit outputs a signal of one bit per sample.

8. The signal processing device according to claim 1, further comprising a setting unit which arbitrarily sets the desired value.

9. The signal processing device according to claim 1, wherein the A/D converter, the detecting unit, the difference output unit, and the modulating unit are disposed in an integrated circuit.

10. A signal processing device comprising:
an input unit which inputs an analog video signal;
an A/D converter which converts the analog video signal to digital video signal;
a detecting unit which detects a level in a predetermined period of the digital video signal output from the A/D converter;
a difference output unit which detects a difference between the level detected by the detecting unit and a desired value;
a modulating unit which performs sigma-delta modulation on an output from the difference output unit;
a setting unit which sets a desired period when the modulating unit outputs a modulation result; and
a clamping unit which performs a clamping process on the analog video signal input by the input unit based on an output from the modulating unit and which outputs the clamped analog video signal to the A/D converter, wherein the clamping unit performs the clamping process only in the desired period set by the setting unit.

11. The signal processing device according to claim 10, further comprising a low-pass filter which filters the output from the modulating unit, wherein the clamping unit performs the clamping process on the analog video signal input by the input unit based on an output from the low-pass filter.

12. The signal processing device according to claim 10, wherein an operating frequency of the modulating unit is higher than a frequency band of the analog video signal.

13. The signal processing device according to claim 12, wherein the operating frequency of the modulating unit is n times a color subcarrier signal frequency of the analog video signal, wherein n is an integer of 2 or more.

14. The signal processing device according to claim 10, further comprising a gain changing unit which changes an output gain of the difference output unit.

15. The signal processing device according to claim 10, wherein the modulating unit outputs a signal of one bit per sample.

16. The signal processing device according to claim 10, further comprising a setting unit which arbitrarily sets the desired value.

17. The signal processing device according to claim 10, wherein the A/D converter, the detecting unit, the difference output unit, and the modulating unit are disposed in an integrated circuit.

* * * * *